April 1, 1930.  J. E. SKELL  1,752,814
FRAME FOR HOLDING PHOTOGRAPHIC FILMS AND PLATES
Filed March 28, 1929
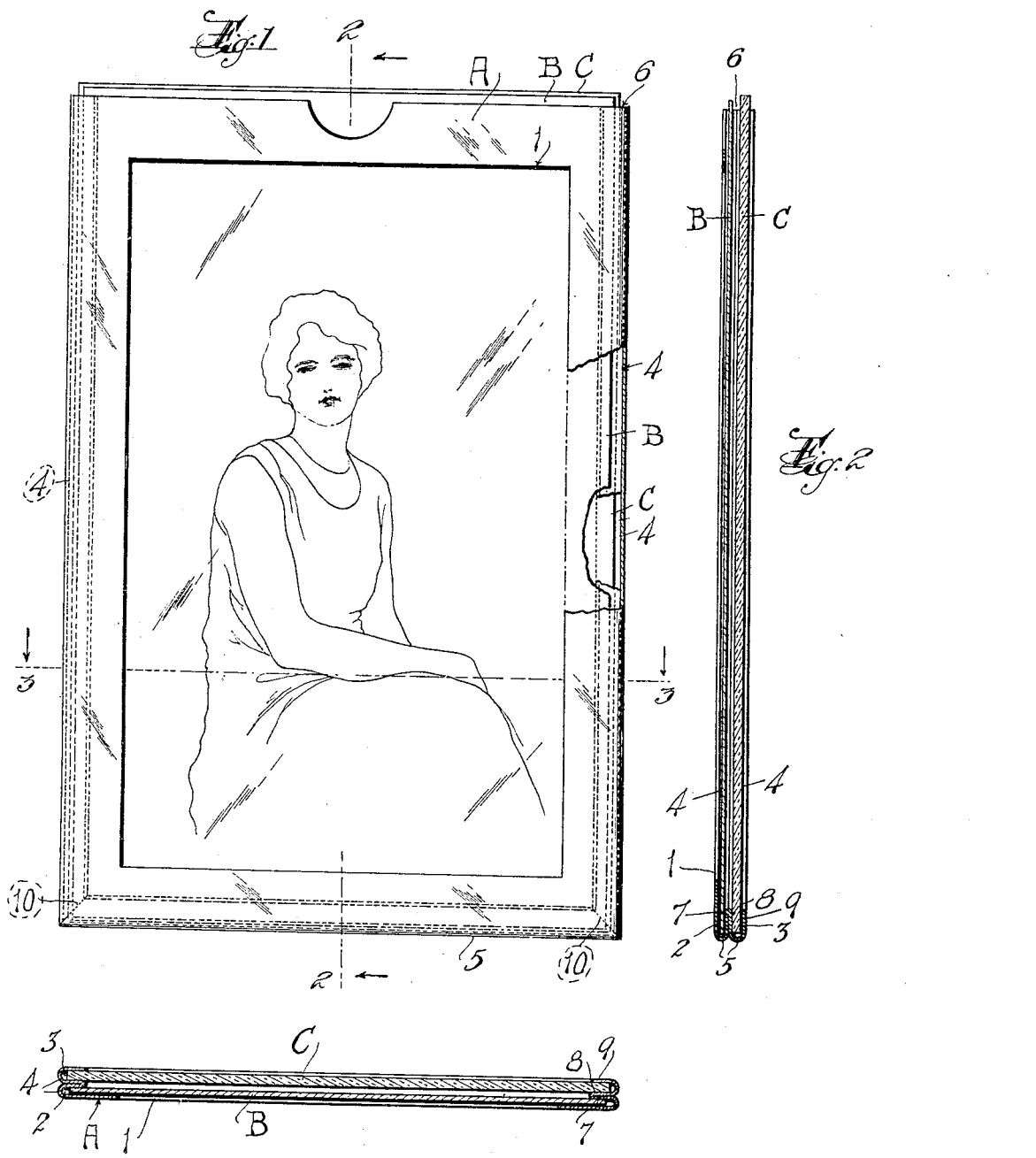

Patented Apr. 1, 1930

1,752,814

UNITED STATES PATENT OFFICE

JAMES E. SKELL, OF NEWARK, NEW JERSEY

FRAME FOR HOLDING PHOTOGRAPHIC FILMS AND PLATES

Application filed March 23, 1929. Serial No. 350,509.

This invention relates in general to a frame for holding photographic films and plates particularly during retouching operations thereon whereby the film or plate is protected against finger marking during handling, and is held against movement under the hand of the retoucher. The holder is also useful in the handling of films in that the films are prevented from buckling or curling during handling or retouching thereof.

One object of the invention is to provide a frame or holder of the character described embodying novel and improved features of construction and comprising a rigid frame in which a photographic film and a translucent or transparent backing plate may be removably mounted in superposed relation with the emulsion side of the film exposed. The frame also permits of a photographic plate being removably arranged therein for handling or retouching, with or without a transparent or translucent backing plate.

Other objects are to provide a frame or holder for films or plates consisting of a single sheet of metal which has its edges bent or shaped to form two guide-ways in parallel planes, one to removably receive the photographic film or plate and the other to receive the backing plate; to provide such a frame or holder formed of a single sheet of metal having an opening therein and its edge portions returned upon themselves to form parallel guideways for removably receiving a film and a backing plate so that the edges of the film are encased and protected by the frame while the main portion of the film is exposed through said opening, to provide such a frame or holder which is simple and inexpensive in construction and to obtain other advantages and results as will be more fully brought out by the following description.

Referring to the accompanying drawing, in which corresponding and like parts are designated throughout the several views by the same reference characters, Figure 1 is a plan view of a frame or holder for photographic films or plates, embodying my invention.

Figure 2 is a longitudinal vertical sectional view on the line 2—2 of Figure 1, and Figure 3 is a transverse vertical sectional view on the line 3—3 of Figure 1.

Specifically describing the illustrated embodiment of the invention, the holder comprises a substantially rectangular frame A corresponding in size and shape to that of the film or plate to be mounted therein, said frame having an opening 1 therein somewhat smaller than the film or plate. A pair of guideways 2 and 3 is provided in the frame for holding the film or plate B and a translucent or transparent backing plate C. These guideways are preferably in parallel planes which are also parallel to the plane of the front of the frame in which the opening 1 is provided. Each guideway includes side portions 4 arranged at the side of the frame and an end portion 5 disposed at one end of the frame. Both of the guideways are open at their other ends as indicated at 6. The dimensions of these guideways are such as to nicely slidably receive the respective film or plate and backing plate C which may be slid into the guideways through the open ends 6 thereof; and the guideways are so arranged with respect to the opening 1 as to not obstruct the passage of light through said opening.

With this construction it will be observed that when a film or plate is arranged within the holder, the edges of the film or plate are encased and protected by the holder against contact with the fingers of the user, the marginal portions of the frame serving as gripping surfaces. Also the guideway 2 holds the edges of the film against curling or buckling, and the whole frame prevents slipping of the film or plate under the hand of the operator during retouching of the film or plate.

Preferably the frame is formed of one piece of sheet metal having the opening 1 formed in approximately the center thereof and with the edge or marginal portions of the sheet returned upon themselves to form the guideways 2 and 3 as clearly shown in Figures 2 and 3. In other words, the marginal portion of the sheet is first bent inwardly over itself as at 7 to form the guideway 2, the remaining marginal portion being then bent outwardly as at 8 and then again inwardly as at 9 to form the guideway 3. Preferably the marginal portions are mitered at the corners as indicated at 10. The dimensions of the edges of the guideways are greater than those of the opening 1 so the edges do not overlie the opening in such a manner as to obstruct the passage of light therethrough.

The frame is therefore entirely rigid in all directions, and the film or plate and the backing plate C can be easily and quickly slid into and out of the frame without any tendency to bind upon each other.

Obviously the size and shape of the holder, as well as the other details of construction may be modified or changed by those skilled in the art, without departing from the spirit or scope of the invention which is defined by the appended claims when construed in the light of the prior art. I am aware of such constructions as shown in Patents Nos. 1,352,037 and 1,544,139, dated September 7, 1920, and June 30, 1925, respectively, and do not desire to be understood as attempting to claim such devices.

Having thus described my invention, what I claim is:

1. A device of the character described comprising a frame having a front portion formed with an opening therein, and a pair of guideways each comprising side portions and an end portion disposed respectively at the sides and one end of the frame, said guideways being disposed in planes parallel to the plane of the frame and having one end open, whereby a photographic film or plate and a backing plate may be slidably inserted one into each guideway.

2. A device of the character described comprising a frame formed of a single piece of stiff malleable sheet material having a main front portion formed with an opening, the marginal portions of said piece of material at the sides and one end being returned inwardly over themselves to form a guideway and then outwardly and again inwardly to form another guideway, both guideways being in planes parallel to said front portion and open at one end to slidably receive respectively a film or plate and a light passing backing plate.

JAMES E. SKELL.